United States Patent [19]

Ezawa et al.

[11] Patent Number: 5,378,968
[45] Date of Patent: Jan. 3, 1995

[54] MANIPULATOR

[75] Inventors: Naoya Ezawa; Naoki Noguchi; Shinichi Takarada; Masahiro Matsuzawa, all of Yokohama, Japan

[73] Assignee: Hitachi, Ltd., Tokyo, Japan

[21] Appl. No.: 140,891

[22] Filed: Oct. 25, 1993

Related U.S. Application Data

[63] Continuation of Ser. No. 813,836, Dec. 27, 1991, abandoned.

[30] Foreign Application Priority Data

Dec. 27, 1990 [JP] Japan .................................. 2-407622

[51] Int. Cl.6 .............................................. G05D 3/00
[52] U.S. Cl. ............................. 318/568.1; 318/568.16; 318/568.18; 318/591; 364/474.11; 901/8
[58] Field of Search ................. 318/560-646; 901/1, 3, 5, 7, 8, 9, 12-15, 16-23; 395/80-99; 414/730-735

[56] References Cited

U.S. PATENT DOCUMENTS

| | | | |
|---|---|---|---|
| 4,084,083 | 4/1978 | McNally et al. | 318/569 X |
| 4,420,812 | 12/1983 | Ito et al. | 318/573 X |
| 4,497,028 | 1/1985 | Nozawa et al. | 318/591 |
| 4,513,379 | 4/1985 | Wilson et al. | 364/474 |
| 4,514,814 | 4/1985 | Evans | 364/474 |
| 4,517,653 | 5/1985 | Tsuchihashi et al. | 318/568 |
| 4,541,060 | 9/1985 | Kogawa | 318/574 X |
| 4,606,001 | 8/1986 | Rieben et al. | 364/474 X |
| 4,613,803 | 9/1986 | Hasegawa et al. | 318/587 |
| 4,661,032 | 4/1987 | Arai | 901/8 X |
| 4,706,001 | 11/1987 | Nakashima et al. | 318/568 |
| 4,712,052 | 12/1987 | Omae et al. | 318/625 |
| 4,865,514 | 9/1989 | Tsuchihashi et al. | |
| 4,873,476 | 10/1989 | Kurakake et al. | 318/568.22 |
| 4,878,002 | 10/1989 | Heatzig et al. | 318/568.2 |
| 4,887,222 | 12/1989 | Miyake et al. | 364/513 |
| 4,888,534 | 12/1989 | Kuchiki | 318/567 |
| 4,897,586 | 1/1990 | Nakata et al. | 318/568.1 |
| 4,906,907 | 3/1990 | Tsuchihashi et al. | |
| 4,955,654 | 9/1990 | Tsuchihashi et al. | |
| 5,032,975 | 7/1991 | Yamamoto et al. | 364/474.11 |
| 5,038,089 | 8/1991 | Szakaly | 318/568.11 |

Primary Examiner—Paul Ip
Attorney, Agent, or Firm—Fay, Sharpe, Beall, Fagan, Minnich & McKee

[57] ABSTRACT

A manipulator whose economic efficiency and reliability are raised by reducing the size and weight of the system through the backup by a common specification drive circuit and actuator when a fault occurs is provided. Thus, the actuator of the end effector is made so as to have the common structure as the actuators of the multiple joints, so that they are driven by a common specification drive unit. Two systems which can be switched are provided in the actuator of the end effector and additionally, a spare drive unit is provided.

8 Claims, 6 Drawing Sheets

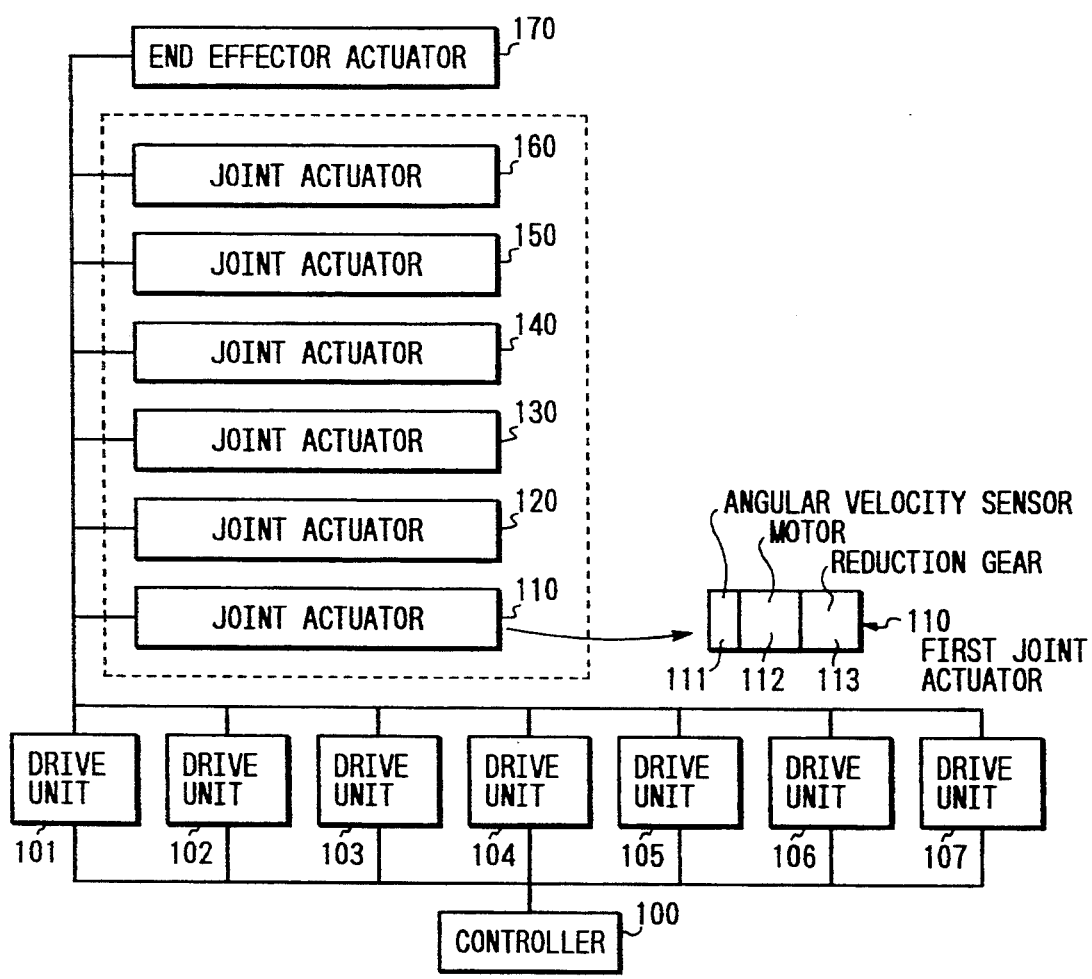

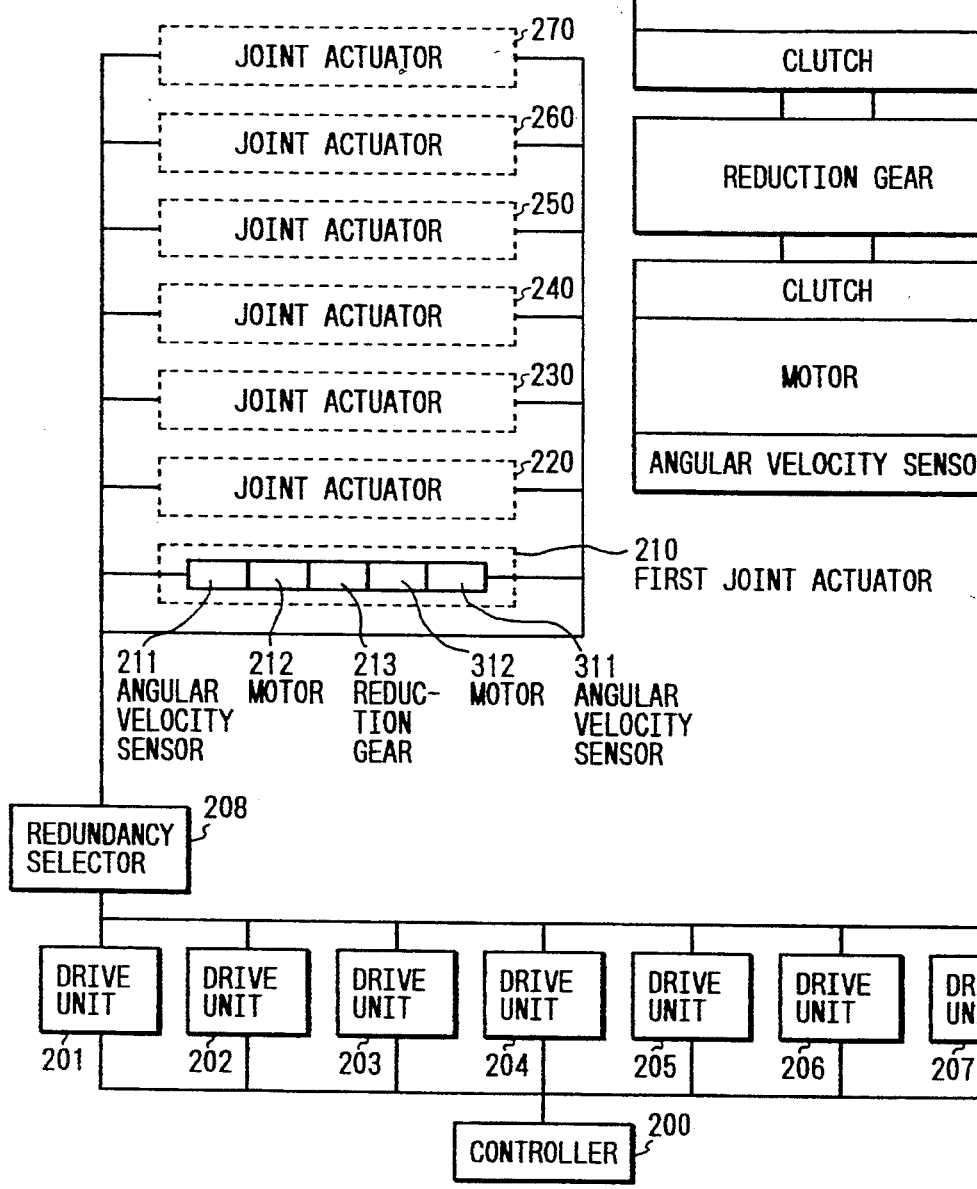

MANIPULATOR

This is a continuation of application Ser. No. 07/813,836, filed Dec. 27, 1991.

BACKGROUND OF THE INVENTION

FIELD OF THE INVENTION

This invention is of a manipulator that in particular can work optionally under such a special environment as space, equipped with an improved reliability end effector.

The conventional space applied manipulator, as mentioned in the Japanese Patent Application Laid-Open No. 64-17102, was equipped with an actuator whose specification differs between the joints, but the mechanism and electronic unit were not made redundant. Thus a system in which the actuator is replaced with a preliminarily prepared actuator when it gets into trouble was applied.

Because, in the above mentioned conventional technology, the actuator specification differs between the joints, individual joints need to be produced according to each different specification, so that there was a problem in that the man-hours for procurement, processing and test of each part and the costs increased.

Further, because each joint individual redundancy, spare joints are not interchangeable between different joints despite complete (double) redundant composition, thus the maintainability was not so satisfactory.

SUMMARY OF THE INVENTION

The purpose of this invention is to solve the above mentioned subjects, reduce the man-hours for design, procurement of parts, processing and test, and then provide a manipulator having a high economic efficiency and improved reliability.

To solve the above mentioned problem, in the manipulator of this invention equipped with multiple joints and coupled with an end effector provided at the tip, at least parts of the actuators of the said multiple joints are made to be of the common structure and/or mechanism and further, the said end effector actuator is made to have the same structure and/or mechanism as the actuators of the said joints.

Additionally, the said multiple joints and the drive unit of the actuator of the said end effector are made common so as to be interchangeable, and further, a reserved drive unit is provided.

In addition, the said individual drive unit is provided with an output current limit circuit.

In addition, two actuator systems which can be changed over are provided in the said end effector.

The individual joints and actuator of the end effector of this invention configured as described above have a common structure and/or mechanism, and are driven by a common drive unit, and when a trouble occurs, that drive unit is replaced with a reserved drive unit.

The maximum output current for the said drive unit is changed corresponding to an allocated actuator.

The said end effector is provided with two actuator systems, and when a trouble occurs, replaced.

BRIEF DESCRIPTION OF THE DRAWING

FIG. 1 is the configuration drawing of the manipulator of this invention.

FIG. 2 is the view illustrating the other configuration of the manipulator of this invention.

FIG. 3 is the view illustrating the configuration of the joint actuator of this invention.

DESCRIPTION OF THE PREFERRED EMBODIMENTS

Figure 5:
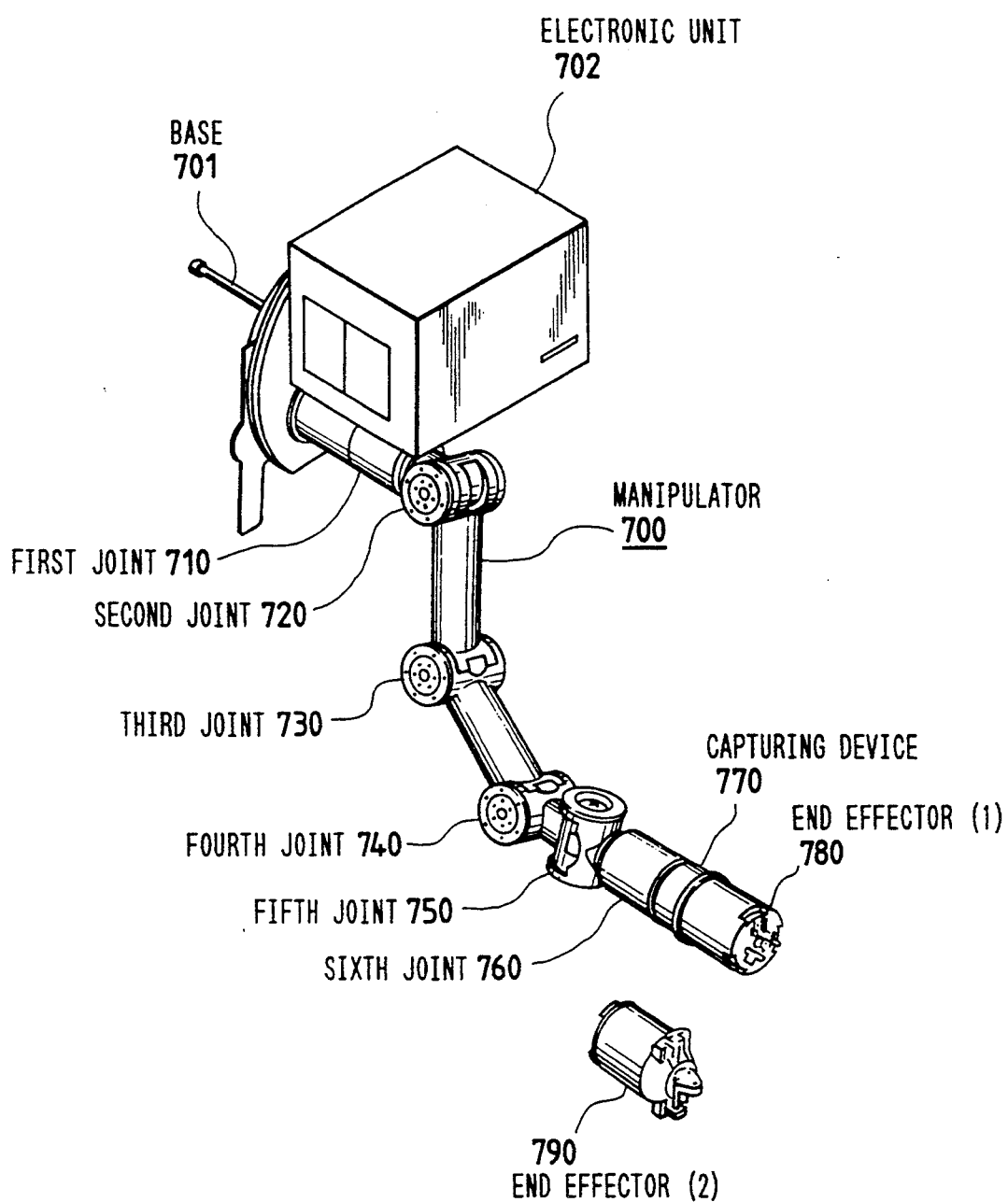
FIG. 5 shows the appearance of the manipulator of this invention.

The overall configuration of the manipulator of this invention is explained according to FIG. 5.

Referring to FIG. 5, the manipulator is provided with the first-sixth joints, an end effector via a capturing device 770 at its tip, and fixed to the base 701.

When the end effector (1) is replaced with the other end effector (2), the end effector (1) is released by the capturing device 770, and the capturing device is transferred to the end effector (2) position so as to mount that end effector.

The electronic unit 702 incorporates the actuator drive circuit for the first-sixth joints and end effector.

In FIG. 5, the end effectors (1) and (2) have the common configuration and can be driven by a common drive circuit, and because the individual joints are made common, they can be driven by a common drive circuit.

EMBODIMENT 1

FIG. 1 is the block diagram illustrating the individual control elements of the manipulator shown in FIG. 5.

The controller 100 determines an instruction value for the individual joints 710-760 and end effector (1) and outputs to the drive units 101-107 of the first-sixth joints and end effector (1).

The actuator in the first joint incorporates an angular velocity sensor 111, motor 112 and reduction gear 113, and the signal from the angular velocity sensor 111 is fetched into the first joint drive unit and used for control. The actuators of the second-sixth joints and end effector are the same as that of the first joint.

Referring to FIG. 1, the individual drive units are made common and the individual actuators 110-170 are made common.

Thus, the individual drive units 101-107 are interchangeable and the individual actuators 110-170 are also interchangeable.

Consequently, when the actuator 170 of the end effector (1) is in trouble, it is replaced with the above mentioned common spare actuator to continue the operation.

If the drive unit 106 is in trouble, the drive unit 107 is used instead, and the manipulator tip is moved to an objective position by means of the sixth joint, and then the drive unit 107 is switched to the end effector actuator 170. Namely, because the individual drive units are common, the sixth joint 760 and end effector actuator 170 can be driven successively by the drive unit 107. As a result, if the drive unit 106 is in trouble, such an emergency can be overcome. After that, the drive unit in trouble is replaced with a common spare drive unit.

EMBODIMENT 2

FIG. 2 is the block diagram illustrating the individual elements of the seventh manipulator 700 which has seven degrees of freedom and is mechanically provided with a redundant system.

The controller 200 determines an instruction value for each joint and end effector (1) and outputs to the drive units 201 to 207. The individual drive units 201 to 207 drive the first to seventh joint actuators 210 to 270.

The first joint actuator incorporates the angular velocity sensor 311 and motor 312 as the above mentioned redundant system, in addition to the angular velocity sensor 211, motor 212 and reduction gear 213. When the angular velocity sensor 211 or motor 212 is in trouble, the redundancy selector 208 exchanges the angular velocity sensor 211 and motor 212 with the angular velocity sensor 311 and motor 312. The above mentioned redundant system operates in the same manner for the actuators 220 to 270 of the second to seventh joints, and the actuators 210 to 270 of the individual drive units 201 to 207 and first to seventh joints are made common.

EMBODIMENT 3

FIG. 3 illustrate another configuration of the redundant system for the individual joints shown in FIG. 2.

In FIG. 3, the angular velocity sensor 411 and motor 412 for the first system and the angular velocity sensor 511 and motor 512 for the second system are provided in the single joint, and the above mentioned first system and second system can be coupled with the reduction gear by means of the clutches 413 and 513.

For example, if the angular velocity sensor 411 and motor 412 of the first system is coupled with the reduction gear 414 by means of the clutch 413 while the second system is separated from the reduction gear 414 by means of the clutch 513, the clutch 413 is separated from the speed reducer 414 when a trouble occurs in the first system, so that the clutch 513 is coupled with the speed reducer 414 so as to actuate the second system.

The configuration shown in FIG. 3 is effective for the countermeasure for such an accident as when the shaft of the motor 412 is sticked due to a lubrication trouble.

EMBODIMENT 4

Figure 4:
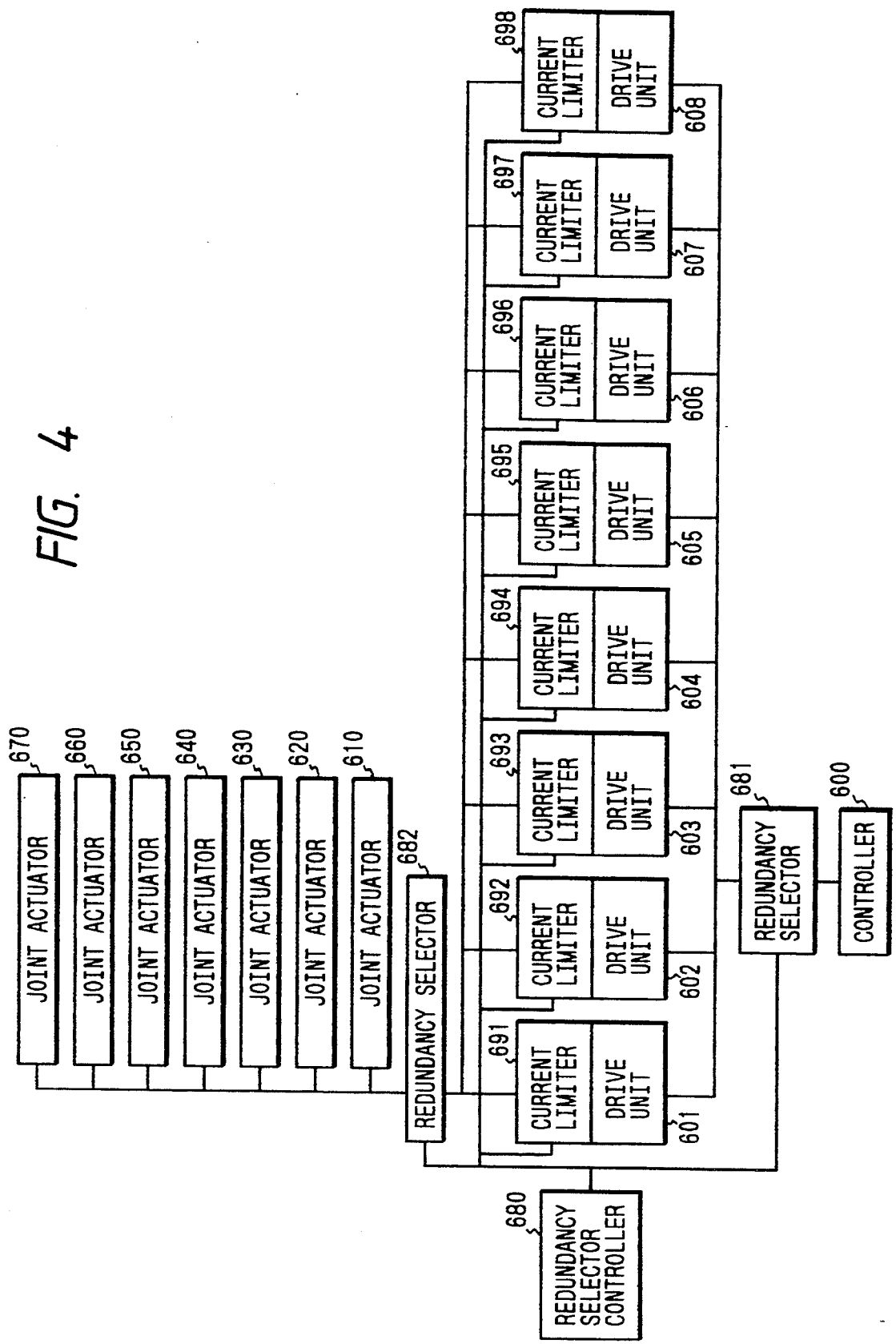
FIG. 4 is the view illustrating the other configuration of the manipulator of this invention.

FIG. 4 illustrates the configuration of another embodiment of this invention having the above mentioned redundant system.

The control system 600 determines an command value to the actuators 610 to 670 of the first to seventh joint actuators and actuates the drive units 601 to 608. Meanwhile, the drive unit 608 is a spare unit and then the drive units 601 to 608 and joint actuators 610 to 670 are made common.

Of the above mentioned drive units, seven drive units are utilized corresponding to the seven joint actuators and when one of them is in trouble, it is changed over to the remaining one. The selectors 681 and 682 are the redundancy switch units for this switching, and the selector 681 selects seven of the eight drive units 601 to 608, connecting a signal from the controller 600, and the selector 682 supplies each output of the selected seven controllers to the joint actuators 610 to 670 of each joint. The controller 680 is the redundancy selector controller for controlling the operation of the selectors 681 and 682.

Because the required current differs depending on the joint, the individual drive units 601 to 608 are equipped with a current limiter 691 to 698, which restricts the output current of each drive unit selected above by means of the redundancy selector controller 680 depending on a corresponding actuator.

Assuming that the reliability of the drive units 601 to 608 shown in FIG. 4 is equally "r" and that of the section including the redundancy selector controller 680, redundancy selectors 681 and 682 is the same as the above mentioned "r", the entire reliability $\lambda_1$ of FIG. 4 is given by the expression (1).

$$\lambda_1 = r^8 + {}_8C_1 \times (1-r) \times r^7 \qquad (1)$$

Because the individual drive units of the conventional system are not common, a spare drive unit must be installed on each drive unit, thus the number of spare drive units increases to 7 corresponding to one spare drive unit shown in FIG. 4.

The entire reliability $\lambda_2$ of this conventional system is given by the expression (2).

$$\lambda_2 = \{1 - (1-r)^2\}^7 \qquad (2)$$

In case no redundant system is provided, the reliability $\lambda_3$ is given by the expression (3).

$$\lambda_3 = r^7 \qquad (3)$$

Figure 6:
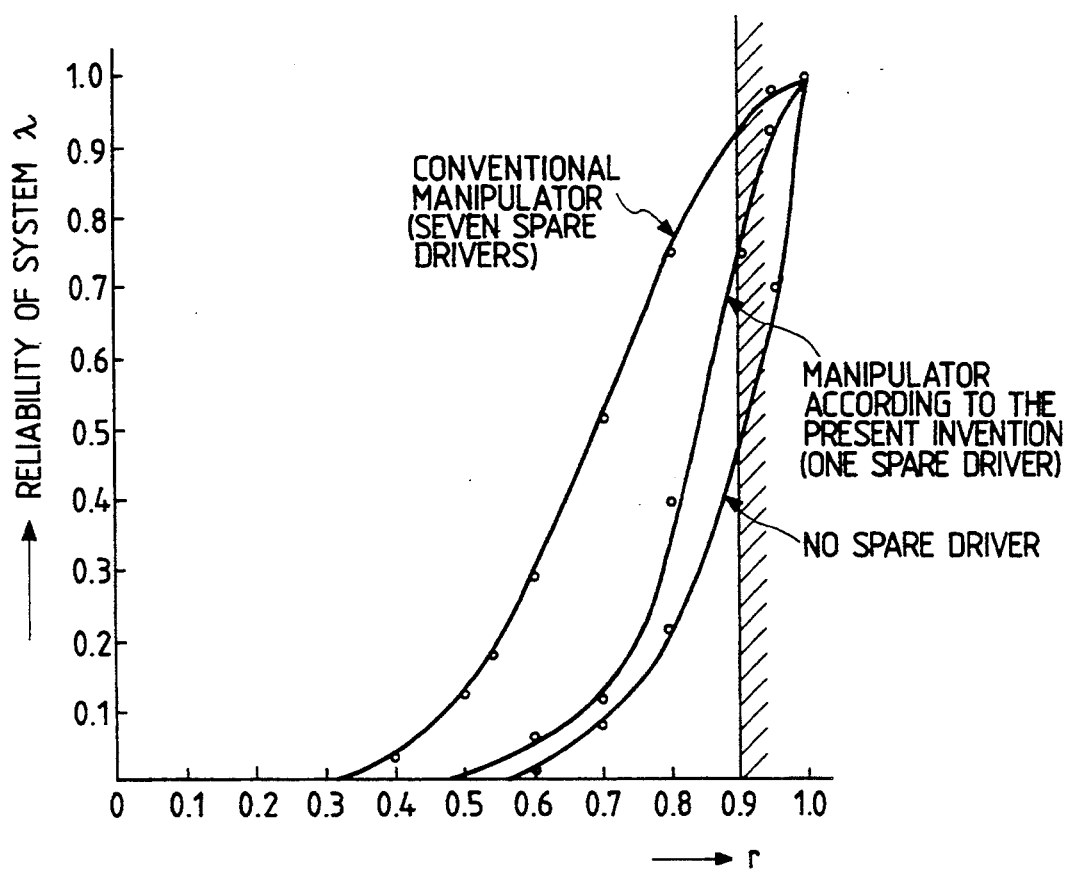
FIG. 6 is the diagram indicating the comparison of the system reliability between the manipulator of this invention and the conventional manipulator.

FIG. 6 illustrates the comparison of the above mentioned expressions (1) and (2). Assuming "r" to be 0.9, the system reliability $\lambda_1$ of this invention shown in FIG. 4 is improved to 0.81 while the system reliability when no spare is provided is $\lambda_3 = 0.47$, so that the system reliability $\lambda_2$ of the conventional system equipped with seven spare units becomes about 0.93.

If, assuming r=0.9, the number of the spare unit shown in FIG. 4 is increased to 2, the above mentioned $\lambda_1$ becomes 0.96, exceeding the above mentioned $\lambda_2$ value. Namely, this invention makes it possible to secure system reliability equal to or higher than the conventional double redundancy system by a smaller number of spare units.

AN EMBODIMENT OF THE REDUNDANCY SELECTOR CIRCUIT

Figure 7:
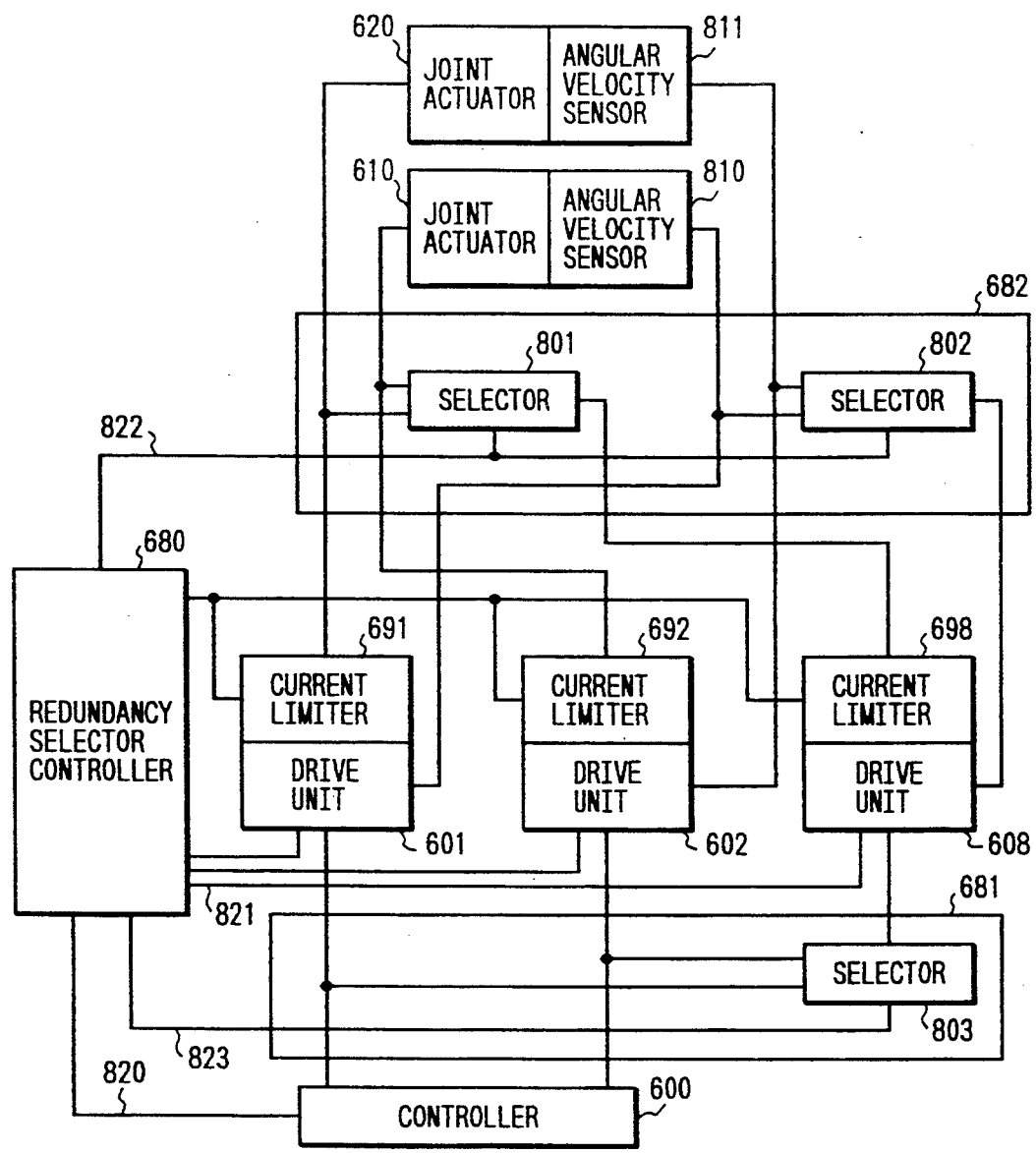
FIG. 7 illustrates an embodiment of the redundancy selector circuit to be applied for this invention.

FIG. 7 illustrates an embodiment of the redundancy selector realizing the redundant system, in which two drive units and two joint actuators are provided together with a spare drive unit. Still, the following description to be established for the case shown in FIG. 4.

The redundancy selector controller 680 obtains the drive unit No. to be switched, the numbers preliminarily allocated to the drive units 601 to 602, together with the switch action permission signal 820 from the controller 600, and sets an instruction value to the redundancy selectors 681 and 682, and the limit level of the current limiter of the drive units 601 and 602, and controls the operation sequence. The current limit level can be selected by a number preliminarily allocated corresponding to the current limit value of each drive unit and entering this limit number to the drive unit enables the current limit level to be switched. The limit number is set in the redundancy selector controller 680 corresponding to the number of drive unit 601 and 602.

According to the number of the drive unit to be switched, which is sent along line 823 from the redundancy selector controller 680, the redundancy selector 681 selects an instruction value from the controller 600 for the drive unit to be switched, and inputs it into the spare drive unit 608 by means of the selector unit 803.

The redundancy selector controller 682 consists of the selector units 801 and 802, and according to the switch object number 822 from the redundancy selector controller 680, the selector unit 802 connects the output signal of the angular velocity sensors 810 to 811 of the joint to be switched to the spare drive unit 608, and also the selector unit 801 switches the output of the spare drive unit 608 electrically for the drive signal for an actuator corresponding to the drive unit to be switched.

The redundancy selector controller 680 controls the states of the redundancy selectors 681 and 682 in the following order. First, to avoid the run-away of a joint upon switching due to a failure of a drive unit output stop instruction from the controller 600, it generates the output stop instruction 821 for the drive unit to be switched and stops the driving of a corresponding joint actuator. Next, to avoid an input signal unstable condition, it sets such a value to keep down any joint actuator to a spare drive unit as the instruction. After that, the signal of the angular velocity sensor of the actuator, corresponding to the drive unit to be switched, is electrically connected to the spare drive unit 608 by means of the selector unit 802, and then the output of the spare drive unit 608 is electrically connected to the drive signal path by means of the selector unit 801, and then it outputs a redundancy selection completion signal to the controller 600. Finally, an instruction value of the drive unit to be switched is input to the spare drive unit by means of the redundancy selector 681. The above mentioned switch action sequence enables switching of a drive unit to be switched to a spare drive unit.

According to this invention, by making common the actuator of each joint and its drive circuit of the manipulator, the individual actuators can share the spare drive circuit providing backup against a system fault, so that the number of the spare drive units can be reduced so as to reduce the size and weight of the system and simultaneously improve the economic efficiency and reliability.

Further, each actuator and its drive circuit can be designed and produced according to a common specification, so that the consideration on the design can be performed in a short term, thereby reducing the man-hours for design, manufacturing and test, and parts procurement man-hours and those costs.

What is claimed is:

1. A manipulator, comprising:
   a plurality of joints each having a joint actuator;
   said joint actuators having at least one of the same structure and mechanism as one another;
   an end effector having an end effector actuator coupled to an end of the manipulator, wherein said end effector actuator has one of the same structure and mechanism as said one of said structure and mechanism of said joint actuator;
   drive units for driving the joint actuators and the end effector actuator;
   a controller for controlling said drive units; and
   a spare drive unit that is interchangeable with the drive units for driving the joint actuators and the end effector actuator, and a redundancy selector for selecting and allocating the drive units to the actuators of said plurality of joints and the actuator of said end effector from among said drive units for driving the joint actuators and said end effector actuator, and said spare drive unit.

2. A manipulator according to claim 1, wherein at least one of the drive units for driving the joint actuators of said plurality of joints is interchangeable with the drive units for driving the end effector actuator of said end effector.

3. A manipulator according to claim 1, wherein said end effector actuator includes at least two actuator systems and a switch unit.

4. A manipulator according to claim 1, further including current limiters for changing a current limit value of the drive unit for the joint and end effector actuators.

5. A manipulator, comprising:
   a first joint having a first actuator;
   a second joint having a second actuator that is interchangeable with the first actuator, and drive means for driving the first or second actuator, selectively;
   an end effector incorporating a third actuator having one of at least the same structure and mechanism as the first actuator, and selective means for driving said first or third actuator, selectively; and
   a spare drive means interchangeable with the respective drive means for driving the first, second and third actuator, and a redundancy selector controller for selecting and allocating any of the respective drive means to the joint and end effector actuators from among the drive means of said joint and end effector actuators, and said spare drive means;
   wherein the respective drive means for driving the first and second actuators of said first and second joints are interchangeable with the drive means for driving the third actuator of said end effector.

6. A manipulator according to claim 5, wherein the third actuator of said end effector has the same structure as the first and second actuators.

7. A manipulator according to claim 5, wherein said end third actuator includes at least two systems and a switch unit.

8. A manipulator according to claim 5, further comprising:
   a capturing device at one end of the end effector, wherein one of said joints is coupled to said end effector through said capturing device.

* * * * *